Patented Dec. 29, 1953

2,664,356

UNITED STATES PATENT OFFICE 2,664,356

PROCESS FOR TREATING FRUIT WASTE

James Russell McCaughna, San Jose, Calif.

No Drawing. Application July 14, 1951,
Serial No. 236,849

27 Claims. (Cl. 99—2)

This invention relates to the treatment of fruit wastes which are necessary by-products of canneries and offer many problems of disposition. This application is a continuation-in-part of my earlier applications, Serial No. 88,496, filed April 19, 1949, now abandoned and Serial No. 104,594, filed July 13, 1949.

It is a primary object of this invention to provide a highly efficient method for the disposal of canneries and other fruit wastes and incidentally to produce usable by-products therefrom.

More particularly it is an object of the invention to provide a commercial treatment which will have immediate effects so that disposal operations may be made continuous and the treated wastes and waste by-products may be easily pumped through flow lines to places of disposition without complication or delay. By the term "immediate" is meant within a short interval such as around five to thirty seconds, as later indicated.

A more specific object is to provide a fast and efficient process for the treatment of deciduous fruit waste, such as apple, peach and pear waste.

Other objects and the various features of the invention will become apparent to those skilled in this art upon reference to the following specification.

Many attempts have heretofore been made to handle fruit wastes satisfactorily, including both deciduous and citrus fruit wastes. Especially with apple, peach and pear wastes, a slimy condition develops which interferes with separation of the aqueous or liquid constituents of the resultant pulps, and in some treatments the pulp wastes set up as gels in a short time which make juice separation very difficult and render the handling of the wastes by pumps or otherwise commercially prohibitive.

Various agents and procedures heretofore proposed have included, for example, calcium and magnesium carbonate additions in attempts to break the slimes and prevent setting up of gel-like formations which will not liberate the accompanying aqueous liquids and will not pump. So far as is known, these have all been relatively ineffective or have involved batch standing periods of such length as to be commercially useless. For example, up to 5% of calcium carbonate has been employed in the treatment of deciduous fruit wastes but without any effect in eliminating sliminess. Other agents such as calcium and magnesium hydroxides have been attempted with equally unsatisfactory results. In employing calcium hydroxide (hydrated lime) about 4% to 5% of calcium hydroxide is required before desliming occurs and juice separation takes place satisfactorily. Thus, where 3% of calcium hydroxide has been used approximately twelve minutes have been required with peach and pear wastes before juice separation begins, and 2% of calcium hydroxide about fifteen minutes are required before sliminess is reduced sufficiently for the juice to begin to separate. In addition, two or three more minutes are required in each instance before the sliminess completely disappears and the material can be pumped to a filter or the juice otherwise satisfactorily separated. Commercially, such a time interval is prohibitive, and if the calcium hydroxide is increased to 4% or as much more as is necessary to effect quick desliming, the product becomes too heavily overloaded with the lime constituent, and, in addition, the cost of the process becomes a serious problem. Ammonium hydroxide alone also has been undertaken, for example from about one-fourth per cent to two or three per cent, but even after an hour's standing juice separation does not take place and loss of sliminess does not occur.

However, I have discovered that if ammonium hydroxide is first used, even in very small proportions such as one-half per cent and, after thorough mixing of the ammonium hydroxide, calcium hydroxide is incorporated in slightly greater proportions, even though in relatively small percentage with respect to the total, immediate desliming and juice separation occur. The pH of the pulp, which initially is about 4 to 5.0 depending on the variety and ripeness of the fruit, is usually raised by the ammonia introduction to between about 8.5 and 9.5, and further raised by the calcium hydroxide to about 10 to 11.7. By immediate separation is meant a matter of a few seconds, such as five or ten seconds, or up to about thirty seconds, as distinguished from four or five minutes or more. However, it is important that the ammonium hydroxide be first mixed thoroughly with the fruit waste, the calcium hydroxide treatment being thereafter applied, even though only a short time thereafter, for example several seconds to one minute's elapse following the mixing of the ammonium hydroxide or a lapse of five minutes to an hour or more. Under these conditions only about one-half per cent to one per cent or one and one-half per cent (by weight) of 26° Baumé ammonium hydroxide (NH₄OH) is required and only about one per cent to two or three per cent of calcium hydroxide (by weight) is required. The amounts of ammonium hydroxide, calculated on the NH₄OH content, are approximately one-half those just given, or about one-fourth per cent to about one-half or three-fourths per cent NH₄OH by weight, and such is the percentage basis used in the claims. Commonly, the larger proportions of each of these agents is required with riper fruits having higher sugar contents, the less ripe, more commonly processed fruits being satisfactorily treated with the lower proportions. While it is possible ordinarily to employ still larger proportions of the two agents (the calcium hydroxide usually being somewhat in excess of the ammonium hydroxide), such uses generally offer no advantage, render the process unduly costly, and sometimes present real disadvantages. Thus, larger proportions of NH₄OH may retard the effects on pear waste, may require a long standing time, or may require excessive calcium hydroxide. Strangely enough a mixture of ammonium hydroxide and calcium hydroxide is only slightly more effective than calcium hydroxide alone, and calcium hydroxide treatment followed by ammonium hydroxide treatment has been found inadequate.

The fruit waste pulp is that characteristically handled in canneries. It commonly contains around ninety per cent of water. It will usually comprise about five per cent solids in addition to its sugar content which may run as high as five per cent and in ripe fruit as high as 10%. Thus, in some instances, the water content might be only eighty-five per cent, for example. If desired to facilitate handling, the water content may be increased somewhat, for example to ninety-five per cent. Upon such a pulp, the stated percentages of treating agents are based.

The amount of ammonia (ammonium hydroxide) is introduced in any appropriate water solution, and is commonly such as to yield a pH value of about 8.5 to 9.5 (well above pH 7) in the mentioned deciduous fruit wastes. After thorough admixture of the ammonia with the fruit pulp, the calcium hydroxide is introduced. This may occur within a few seconds following distribution or much later, for example an hour later, as above indicated. Preferably the calcium hydroxide is added in slurry form as hydrated lime. Powdered lime could be worked into the pulp to yield the required hydroxide. This slurry also is thoroughly admixed, and especially when added is somewhat greater in proportion than the ammonium hydroxide as above indicated, even if promptly after thorough ammonia distribution, the sliminess is destroyed immediately, that is, within a few seconds, such as one to five or ten seconds, and the aqueous liquor breaks out so that easy handling, as by pumping, may be effected.

As has been pointed out above, it is necessary that the ammonia treatment, to effect the stated rise in pH value, be accomplished before the calcium hydroxide is introduced. The reason for this sequence necessity is not entirely clear, although it is known that the ammonia changes the pectous constituents to soluble forms, and that subsequent gel formation is prevented; and it has been found, as previously indicated, that addition of the two agents (ammonium and calcium hydroxides) together produces no advantageous result beyond the use of calcium hydroxide alone, or ammonium hydroxide alone.

In the treatments above outlined, sliminess is promptly destroyed upon the calcium hydroxide treatment, and there is no subsequent gelling. Consequently the mass may be easily pumped and filtered.

Examples

As examples of acceptable methods of procedure, the following are furnished.

One thousand gallons of pear waste (peelings, cores, trimmings, and discards) are finely pulped and passed into an agitator tank as well understood in cannery practices with a total solids content of 5 per cent to 15% as desired or required for ready handling. To this pulp there is added ammonium hydroxide solution to yield about one-fourth per cent (by weight) of NH₄OH; for example, nine or ten gallons of 26° Baumé ammonium hydroxide (about 30% NH₃ by weight). This pulp batch is then agitated to effect thorough distribution of the ammonium hydroxide. Normally a pH of about 9.5 results. If calcium hydroxide is to be added promptly after distribution, about one per cent by weight is introduced as a lime slurry, mixed therein and thoroughly blended. As soon as good distribution is effected, sliminess immediately disappears, and the juice separates freely from the solids. In fact, at the point of introduction of the lime slurry sliminess disappears within five seconds of introduction. If the same batch has been allowed to stand for half an hour or more with the ammonium hydroxide, half the lime slurry may be used with the same results.

Instead of using calcium hydroxide, barium hydroxide may be substituted, which in some cases is even more effective than calcium hydroxide and may therefore be used in slightly smaller proportions. Thus, perhaps the amount of barium hydroxide may be reduced by about one-fourth over the calcium hydroxide with some fruit wastes, for example, from 1.5% to 1.2%.

When the juice has been separated from the pulp, as by filtering, it may in turn be treated with any appropriate mineral acid such as hydrochloric, sulfuric or phosphoric acids to a pH of less than 7 or about 4 to 6.5 to precipitate pectous substances which are removed. This applies when barium hydroxide is used, as well as when the hydroxide of any other alkaline earth-metal is used as mentioned. The effluent may then be discarded or treated for recovery of sugar constituents. The pulp from the filter may be used for animal feed, soil treatment, or such other uses as appropriate for any given product.

For a semi-continuous process, the ammoniated pulp is withdrawn from the tank through a flow line and the lime slurry metered into the flow line in proper proportion, the sliminess quickly disappearing so that the juice breaks out at once, the flow being passed to a filter or to a settler.

A continuous operation is effected by metering both the ammonium hydroxide and the calcium hydroxide successively into a flow line through which the pulp is being pumped. The calcium hydroxide is introduced down stream beyond the point of introduction of the ammonium hydroxide sufficiently for complete distribution of the ammonium hydroxide prior to reaching the feed point of the calcium hydroxide (lime slurry). Since the juice break is quick, pumping thus becomes feasible.

Should the fruit be riper, or the pulp be somewhat more refractory, the ammonium hydroxide may be increased, for example to one per cent, and the calcium hydroxide to one and one-half or two per cent.

Specific percentages which have been used without standing after incorporating the NH4OH are:

|       | Percent | Percent | Percent | Percent | Percent | Percent |
|-------|---------|---------|---------|---------|---------|---------|
| NH4OH | 0.25    | 0.5     | 0.25    | 1       | 0.5     | 0.4     |
| Ca(OH)2 | 1.0   | 2.0     | 1.5     | 3       | 5.0     | 2.0     |

Percentages used where standing of one hour or more was allowed after NH4OH incorporation are:

|       | Percent | Percent | Percent | Percent |
|-------|---------|---------|---------|---------|
| NH4OH | 0.25    | 0.5     | 1.5     | 0.25    |
| Ca(OH)2 | 0.5   | 0.5     | 0.5     | 3.0     |

In addition to treatment of deciduous fruit pulp wastes by the above methods, citrus wastes including peel and discards are also susceptible to successful treatment by these methods.

In all cases ammonium hydroxide may be eliminated by applying heat, and in the case of the juice especially it is desirable to establish a pH less than 7 to yield a better color and flavor in the product.

As to the metal hydroxides employed, it is to be noted that these are divalent alkaline earth-metal hydroxides, to which strontium hydroxide may be added. For this purpose magnesium is classed as an alkaline earth metal. All of these hydroxides are classifiable also as alkaline divalent-metal compounds.

I claim as my invention:

1. A method for treating fruit waste and the like containing sliming constituents, comprising: forming the fruit waste into a pulp; combining with such pulp a minor proportion of ammonium hydroxide and thoroughly distributing the ammonium hydroxide to yield a pH value of about 8.5 to 9.5; and, following incorporation of said ammonium hydroxide, introducing into such ammoniated fruit pulp a minor proportion of an alkaline divalent-metal compound sufficient to destroy sliminess in said pulp in conjunction with said ammonium hydroxide and liberate the liquid from the solid constituents.

2. A method as in claim 1 wherein said ammonium hydroxide is used in the proportion of about one-fourth per cent to one per cent of NH4OH and said alkaline divalent metal compound is used in the proportion of about one-half per cent to four per cent based on the total pulp.

3. A method as in claim 2 wherein the divalent metal compound is an alkaline earth-metal hydroxide.

4. A method as in claim 3 wherein the alkaline earth-metal hydroxide proportion is in excess of the ammonium hydroxide proportion.

5. A method as in claim 4 wherein the alkaline earth metal hydroxide is about 1% to 2% of the pulp and the ammonium hydroxide is about one-fourth per cent to one-half cent of the pulp.

6. A method as in claim 1 wherein the proportion of ammonium hydroxide approximates one-fourth per cent to one-half per cent of the pulp, and the proportion of alkaline earth-metal compound exceeds the proportion of ammonium hydroxide and amounts to about one percent to three per cent of the pulp.

7. A method for treating fruit waste and the like containing sliming constituents, comprising: producing a pulp from the fruit waste; distributing throughout the pulp a proportion of ammonium hydroxide between about one-fourth per cent and one per cent to produce a pH in the pulp above about 8; and, thereafter distributing throughout the pulp between about one-half per cent and three per cent of an alkaline earth metal hydroxide to destroy sliminess in the pulp and effect breaking of the liquid constituents from the solid constituents.

8. A method as in claim 7 wherein the alkaline earth-metal hydroxide is introduced promptly following the ammonium hydroxide and the sliminess is destroyed within a few seconds following the alkaline earth-metal hydroxide introduction.

9. A metal as in claim 8 wherein the proportion of alkaline earth-metal hydroxide is approximately double that of the ammonium hydroxide.

10. A method as in claim 7 wherein, following the distribution of the ammonium hydroxide in the pulp, such ammoniated pulp is allowed to stand for an appreciable period of time for the ammonium hydroxide to become effective on the pulp, and thereafter introducing said alkaline earth-metal hydroxide in proportion not exceeding that of the ammonium hydroxide.

11. A method as in claim 7 wherein the alkaline earth-metal hydroxide is calcium hydroxide.

12. A method as in claim 7 wherein the alkaline earth-metal hydroxide is barium hydroxide.

13. A method as in claim 1 wherein the divalent-metal compound is calcium hydroxide.

14. A method as in claim 1 wherein the divalent-metal compound is barium hydroxide.

15. A method as in claim 7 including separating the liquid from the solid constituents, and lowering the pH of the liquid to below about 6.5 to precipitate the pectous substances present.

16. A method as in claim 1 including separating the liquid from the solid constituents, and lowering the pH of the liquid to below about 6.5 to precipitate the pectous substances present.

17. A method as in claim 7 wherein the alkaline earth-metal hydroxide is sufficient to raise the pH to between 10 and 12.

18. A process for treating fruit waste, comprising the steps of: pulping fruit waste; supplying in the pulp a quantity of an alkaline barium compound to reduce sliminess in the pulp and cause the juice of the pulp to break out; and separating the liberated juice from the pulp.

19. A process as in claim 18 wherein the separated juice is acidified to a pH at least as low as about 6.6 to precipitate pectous substances, and such precipitated substances are separated from the liquid constituents.

20. A process as in claim 19 wherein, following the treatment with said alkaline barium compound, the pulp is additionally treated with an alkaline compound of the class consisting of calcium and magnesium alkaline compounds to reduce refractory sliminess further and further promote juice separation.

21. A process according to claim 20 wherein, prior to treatment with said barium compound, the pulp is treated with an ammonium compound to initiate reduction of refractory sliminess.

22. A process as in claim 18 wherein, following the treatment with said alkaline barium compound, the pulp is additionally treated with an alkaline compound of the class consisting of calcium and magnesium alkaline compounds to reduce refractory sliminess further and further promote juice separation.

23. A process as in claim 22 wherein, prior to treatment with said barium compound, the pulp is treated with an ammonium compound to initiate reduction of refractory sliminess.

24. A process as in claim 18 wherein prior to treatment with said barium compound, the pulp is treated with an ammonium compound to initiate reduction of refractory sliminess.

25. A process for treating fruit waste comprising the steps of: pulping fruit waste; supplying in the pulp a quantity of an alkaline ammonium compound in proportion to reduce sliminess and cause the juice of the pulp to be liberated; and after such treatment with ammonium compound adding thereto a quantity of an alkaline barium compound to further reduce sliminess and effect juice separation.

26. A process as in claim 25 including separating the liberated juice from the pulp treated with said alkaline compounds, and then acidifying the separated juice to precipitate pectous substances.

27. A process as in claim 25 including the additional step of treating the ammonium and barium treated pulp with an alkaline compound from the class consisting of calicum and magnesium alkaline compounds to reduce refractory sliminess further and further promote juice separation.

JAMES RUSSELL McCAUGHNA.

References Cited in the file of this patent

UNITED STATES PATENTS

| Number | Name | Date |
| --- | --- | --- |
| 2,187,501 | Lissauer | Jan. 16, 1940 |
| 2,215,944 | Vincent | Sept. 24, 1940 |
| 2,548,510 | Neal | Apr. 10, 1951 |
| 2,579,609 | Peebles | Dec. 25, 1951 |